United States Patent [19]

Rochat et al.

[11] Patent Number: 4,467,834
[45] Date of Patent: Aug. 28, 1984

[54] DEVICE FOR CONTROLLING THE MIXTURE AND FLOW OF AT LEAST TWO FLUIDS

[75] Inventors: Jean-Denis Rochat, Plan-Les-Ouates; Conrad Zellweger, Chene-Bougeries, both of Switzerland

[73] Assignee: LN Industries S.A., Geneva, Switzerland

[21] Appl. No.: 413,365

[22] PCT Filed: Nov. 20, 1981

[86] PCT No.: PCT/CH81/00130
§ 371 Date: Aug. 16, 1982
§ 102(e) Date: Aug. 16, 1982

[87] PCT Pub. No.: WO82/02101
PCT Pub. Date: Jun. 24, 1982

[30] Foreign Application Priority Data

Dec. 16, 1980 [CH] Switzerland ............... 9257/80

[51] Int. Cl.³ ............................................. F16K 11/16
[52] U.S. Cl. ..................................... 137/637; 137/100; 137/607; 137/625.4; 128/203.28
[58] Field of Search ............... 137/606, 607, 98, 100, 137/111, 637, 625.4; 128/203.25

[56] References Cited

U.S. PATENT DOCUMENTS

| 1,855,505 | 4/1932 | Wilson | 137/98 X |
| 3,875,968 | 4/1975 | Olofsson et al. | 137/607 X |
| 4,019,523 | 4/1977 | Clark et al. | 137/607 X |
| 4,150,684 | 4/1979 | Kervin | 137/111 |
| 4,237,925 | 12/1980 | Urnshida | 137/607 X |

FOREIGN PATENT DOCUMENTS

| 963232 | 7/1964 | United Kingdom . | |
| 250633 | 1/1975 | U.S.S.R. | 137/100 |

Primary Examiner—Martin P. Schwadron
Assistant Examiner—Stephen M. Hepperle
Attorney, Agent, or Firm—Emory L. Groff, Jr.

[57] ABSTRACT

The supply conduits (1, 2) for two different gases to be mixed are each associated to a pressure regulator (3, 4) and lead into two chambers (5, 6) connected by chokes (7, 8) having a variable section area to a mixing chamber (9). A control member (13) allows the cross section area of the chokes (7, 8) to be varied without modifying the ratio between those cross section areas. Another control member (14) allows the ratio between those cross section areas to be varied without modifying the sum. This device allows a mixture of gases of any molecular weight in predetermined proportions.

7 Claims, 5 Drawing Figures

DEVICE FOR CONTROLLING THE MIXTURE AND FLOW OF AT LEAST TWO FLUIDS

For medical, scientific or industrial applications, there is an increasing need for gas mixtures having a specific composition. Most of the time mixtures with two components are involved and apparatus are now on the market that make it possible to make gas mixtures from unit gases in the proportions required for the desired application.

The simplest of these apparatus have two gas intakes which must be fed at a specific pressure. On each pipe there is a valve followed by an apparatus making it possible to measure the flow of the gas. To obtain a specific mixture, at a desired flow, it is necessary each time to make a calculation and to make an adjustment with valves which make it possible to obtain the required flow of each component. If it is desired to change the total flow of the mixed gas, it is necessary to make a new calculation and to adjust individually the new flow calculated for each of the components.

More improved apparatus have a device that makes it possible to stabilize the intake pressure of each of the components, a mixing valve having a graduated control element making it possible to display the composition of the desired gas mixture, an adjustment valve for the flow followed by a measuring instrument making it possible to regulate the desired flow. Although presenting significant progress with respect to the previously descibed apparatus, they still present numerous drawbacks, particularly in accuracy of the mixtures which does not remain stable when the flow is varied and the necessity, to adjust the desired flow, of making an adjustment of the flow while reading the result of the operation on a flowmeter. It is well known that the accuracy of flowmeters often leaves much to be desired. Because of the necessity of reading the flow, these apparatus are very difficult to integrate into automatic process lines where it is still often necessary to obtain gases mixed in specific proportions.

This invention has as its object to eliminate said drawbacks and to make it possible to obtain with ease gas mixtures with specific composition at the desired flow.

The invention has as its object a device for mixing two fluids, particularly two compressed gases, comprising an intake pipe for each of the fluids, a pressure regulating device that makes it possible to deliver each of the two fluids at a specific pressure to a constriction that is appropriate for it, each of the two constrictions having an adjustable section and opening into a mixing chamber, means making it possible to cause the section with the constrictions to vary from zero to a maximum.

The specific object is obtained as a result of the fact that the device comprises two control elements, one of the elements providing the control of the total flow of the mixture of the fluids by a control acting on the two constrictions and causing their free section to vary in the same direction from zero and according to a factor of linear proportionality between the two sections, the other element providing the control of the ratio of the mixture by a control acting on the two constrictions and causing their free section to vary in the opposite direction from each other and according to the same factor of linear proportionality between the two sections.

The accompanying drawing diagrammatically illustrates, by way of example, several embodiments of the mixing device, the object of the invention.

Figure 1:
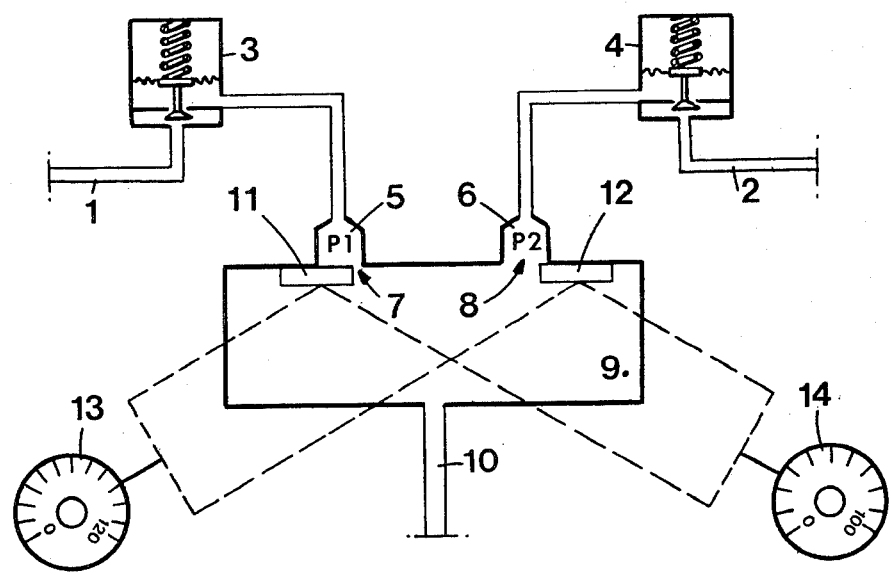
FIGS. 1 and 2 show two basic diagrams of the apparatus.

FIG. 1 illustrates the basic diagram of a device comprising two pipes 1 and 2 for bringing two different gases to be mixed. Each of these pipes is associated with a pressure reducing valve or pressure regulator 3 or 4. The two gases are thus introduced into two chambers 5 and 6 opening through constrictions 7 and 8 into a mixing chamber 9 provided with an outlet pipe 10 for the mixed gas.

Constrictions 7 and 8 have a variable section which can be modified by valves 11 or 12. These valves are controlled by two control elements 13 and 14 in such a way that control element 13 produces a variation of the sum of the sections of constrictions 7 and 8 without changing the ratio between these sections. The other element 14 produces a variation of the ratio between the sections of the constrictions without changing the sum of the sections. Means that make it possible to obtain such control will be described later with reference to FIGS. 3 to 5.

Figure 2:
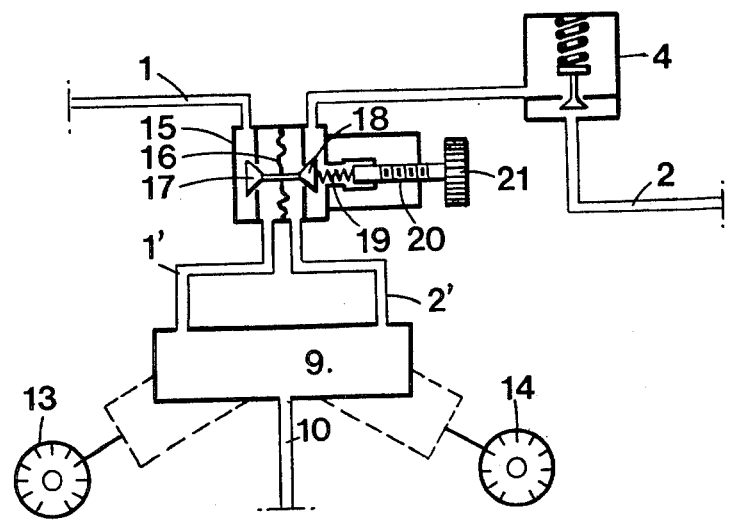

FIG. 2 illustrates a modification of the basic arrangement described in FIG. 1. According to FIG. 2, only pipe 2 is provided with a pressure regulator 4. Pipes 1 and 2 end at a differential pressure reducing valve 15 that makes it possible to fix at will the ratio of the pressures of the two gases leaving through pipes 1' and 2' so as to come into mixing chamber 9.

Differential pressure reducing valve 15 comprises a diaphragm 16 whose faces are subjected to the pressure of the first gas and second gas, respectively. This diaphragm 16 carries two valve elements 17 and 18 that control the passage of the first and second gas. Valve elements 17 and 18 are rigidly connected to each other and subject to the action of a spring 19 whose tension can be adjusted by a screw 20 provided with a knurled head 21.

The arrangement according to FIG. 2 presents a great advantage because it makes it possible to use the same apparatus for mixing gas of a different nature. Actually, it is known that the flow of a gas in a pipe presenting a diaphragm, i.e., a thin wall having a hole, is proportional to the pressure difference ΔP upstream and downstream from this diaphragm, to the section of the hole and to a coefficient C which depends, in particular, on the physical characteristics of the gas. Consequently, if an apparatus were provided to be used with two specific gases and if one gas is replaced with another with different characteristics, the proportion of the mixture will no longer correspond to the calibration of the apparatus. The adjustable differential pressure reducing valve 15 makes it possible to change the pressure ratio of the two gases to compensate for the variation of the flow due to the change in the coefficient C.

Figure 3:
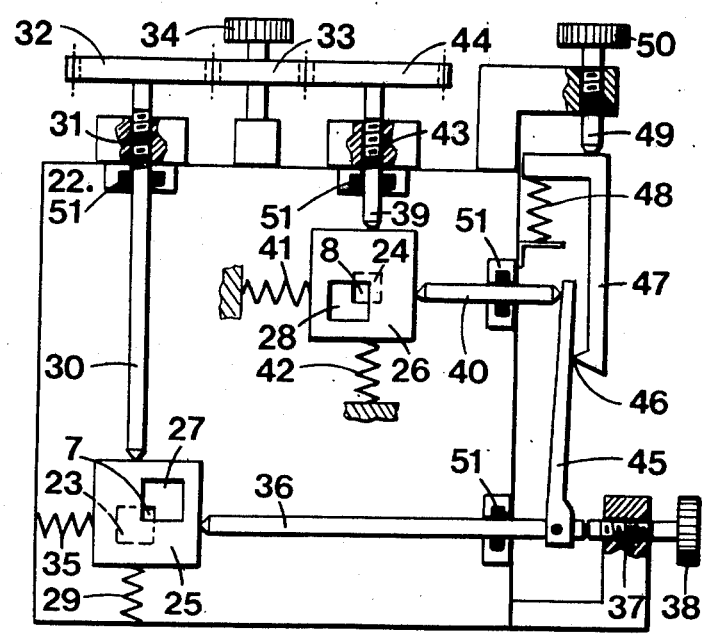
FIG. 3 illustrates an example of mechanical construction.

FIG. 3 shows an embodiment of the device in which a plate 22 is provided with two openings or orifices 23 and 24 having a square cross section for the passage of the two gases to be mixed. This plate comprises a wall of chamber 9 in FIG. 1 and openings 23 and 24 make it possible to connect chamber 9 with chamber 5 and 6 in FIG. 1. The valves consist of two small plates 25 and 26 each having a square opening 27 or 28. Plate 25 can be moved vertically against the action of a spring 29 by a push rod 30 axially movable by a threaded portion 31 controlled by a gear 32 engaged with a geared pinion 33 solid with a control element 34 for controlling the proportion of the gas mixture. This same small plate 25 can be moved horizontally against the action of a spring 35 by a push rod 36 axially movable because of a screw pitch 37 and a control element 38 intended to regulate the total flow of the gas mixture.

Also, small plate 26 can be moved vertically and horizontally by two push rods 39 and 40 that act against the action of springs 41 and 42. Push rod 39 has a threaded portion 43 and a gear 44 engaged with pinion 33. Push rod 40 is controlled by a lever 45 on the end of a part 47 elastically pushed by a spring 48 against the end of an adjusting screw 49. By acting on knurled head 50 of this screw 49, it is possible to move pivoting point 46 of lever 45 and, consequently, to change the ratio between the movements of push rod 36 and 40. The entire control mechanism of push rods 30, 36, 39 and 40 is located outside chamber 9 and each push rod slides in a seal 51.

When knurled head 34 is acted on, it causes a movement in the same direction of push rods 30 and 39. When the latter are moved upward, which causes a corresponding movement of small plates 25 and 26, constriction 7, which consists of the superposed portions of openings 23 and 27, decreases until its section becomes zero. At that time, small plate 26 is also moved until the height of constriction 8, which is determined by the superposed portions of opening 24 and 28, possesses a maximum value. On the other hand, moving push rods 30 and 39 downward causes the closing of constriction 8 until its section is zero while the section of constriction 7 increases until it reaches the height of opening 23. It is thus possible to adjust the mixing ratio of the gases along the entire possible range between zero and 100%.

As a result of the pivoting action by lever 45, push rods 36 and 40 always move in the opposite direction from each other. By moving push rod 40 to the left and push rod 36 to the right, the complete closure of constrictions 7 and 8 is attained when the stops of the openings are superposed.

By acting on knurled wheel 50, pivoting point 46 of lever 45 is moved so that the factor of linear proportionality between the movement of small plates 25 and 26 makes it possible to adapt the variation of the passage section of the constrictions to the coefficients of the flow of the gases controlled by these constrictions. These flow coefficients are a function of the pressure applied to this constriction and of the coefficient C of the fluid. On the other hand, the variation of the passage section of the constrictions can be adapted by changing the ratios of gears 32 and 44.

Figure 4:
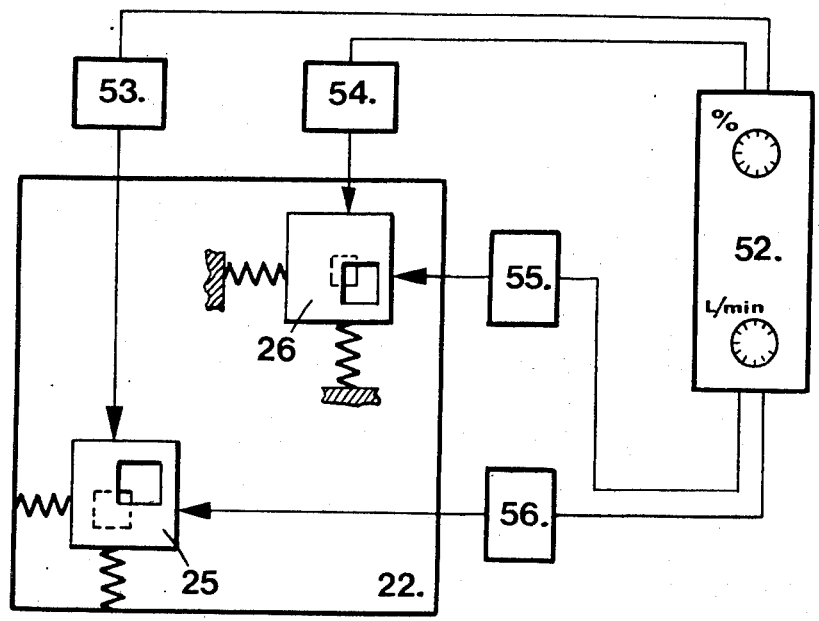
FIG. 4 shows an electronic control device.

FIG. 4 illustrates diagrammatically another embodiment in which the control is achieved electronically by using a microprocessor contained in a central processing unit 52. This central processing unit sends control pulses to four step-by-step motors 53 to 56 which act on small valve plates 25 and 26 of the same kind as those represented in FIG. 3. This electric control allows a great flexibility in the construction. Thus, it is possible simply to have the control of the flow performed by a vertical movement of one of the small plates in conjunction with a horizontal movement of the other small plate, the proportion of the mixture being adjusted then by horizontal and/or vertical movements of these small plates.

Figure 5:
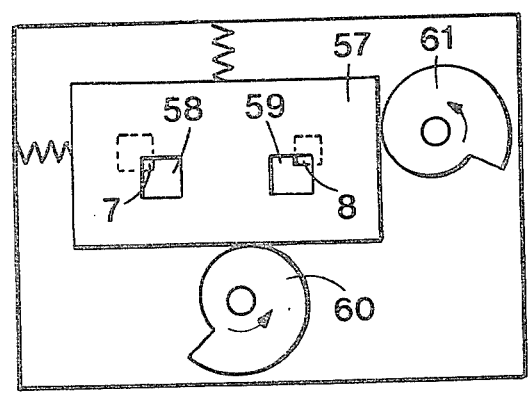
FIG. 5 shows a mechanical control variant.

FIG. 5 shows a mechanical construction in which the constrictions are controlled by a single small valve plate 57 exhibiting two rectangular openings or orifices 58 and 59. The total flow of gas is controlled with a cam 60 which causes vertical movements of small plate 57. The proportion of the mixture is regulated by a cam 61 which causes variations in the opposite direction of the sections of the constriction. However, this construction is advantageous only when the two flow coefficients of the two fluids are identical.

In the described embodiments, it is advantageous that the pressure of the gases upstream from the constrictions is sufficiently high that the flow of the gas is made at the speed of sound. Under these conditions, the mass flow through the constriction becomes independent of the pressure prevailing downstream from this constriction.

Of course, numerous variants of the described device can be provided. It can be noted that the openings have always been represented in rectangular shape. However, it goes without saying they could be in the shape of a parallelogram, the sides of all these openings being oriented in two directions, the valve device being arranged to control movements of its openings in both of these two directions.

It is clear that the mixing of more than two fluids can be performed by an in-series connection of several devices of the type described.

We claim:

1. Device for mixing two gases under pressure, comprising a mixing chamber, an inlet pipe for each of the two gases, a pessure regulating device making it possible to deliver each of the two gases at a specific pressure to a related adjustable constriction, wherein the two constrictions open into said mixing chamber through two orifices in a plate, said plate forming a wall of said chamber, a valve device movable parallel to said plate, the superposed parts of said valve device and said orifices of the plate comprising said constrictions, said orifices of the plate being in the shape of a parallelogram whose sides are oriented in two directions, two control elements cooperating with a calibration each action on said valve device in said two directions, one of the elements providing the control of the total flow of the mixture by causing said constrictions to vary in the same direction from zero and according to a factor of linear proportionality between the two constrictions, the other element providing the control of the ratio of the mixture by causing said constrictions to vary in the opposite direction from each other and according to the same factor of linear proportionality between the two constrictions.

2. Device as in claim 1, wherein the valve device includes two separate small plates, each small plate having an opening, means being provided for moving each of these small plates in each of said directions.

3. Device as in claim 2, characterized by means for regulating the factor of proportionality making it possible to take into account flow coefficients of the fluids to be mixed.

4. Device as in claim 3, wherein it comprises mechanical means for coordinating the movements of the two small plates in each of said directions.

5. Device as in claim 4, wherein the movement of the small plates is controlled by a push rod subjected to the action of an adjusting screw, said push rod being connected to another push rod for controlling the other small plate by a lever device whose transmission ratio is adjustable by means of its engagement with a member resiliently urged by the end of a spring against the end of an adjusting screw to make it possible to fix a ratio of proportionality between the movements of said two push rods.

6. Device as in claim 1, wherein the two inlet pipes are controlled by a differential pressure regulator including an operating knob that makes it possible to regulate, at the desired value, the ratio of the pressures of the two fluids upstream from said constrictions.

7. Device as in claim 1, wherein said valve device includes a single plate having two openings cooperating with said single plate being movable in said two directions by the action of said two control elements.

* * * * *